(12) United States Patent
Verhoog et al.

(10) Patent No.: US 12,066,088 B2
(45) Date of Patent: Aug. 20, 2024

(54) TRANSMISSION SYSTEM COMPRISING A REDUCTION DEVICE AND A DIFFERENTIAL DRIVE DEVICE

(71) Applicant: VALEO EMBRAYAGES, Amiens (FR)

(72) Inventors: Roel Verhoog, Cergy Pontoise (FR); Michael Hennebelle, Cergy Pontoise (FR)

(73) Assignee: VALEO EMBRAYAGES, Amiens (FR)

( * ) Notice: Subject to any disclaimer, the term of this patent is extended or adjusted under 35 U.S.C. 154(b) by 0 days.

(21) Appl. No.: 17/936,594

(22) Filed: Sep. 29, 2022

(65) Prior Publication Data
US 2023/0115338 A1   Apr. 13, 2023

(30) Foreign Application Priority Data
Oct. 8, 2021   (FR) ..................................... 21 10682

(51) Int. Cl.
| | | |
|---|---|---|
| *F16H 48/42* | (2012.01) | |
| *F16H 48/08* | (2006.01) | |
| *F16H 48/24* | (2006.01) | |
| *F16H 48/34* | (2012.01) | |

(52) U.S. Cl.
CPC ............. *F16H 48/42* (2013.01); *F16H 48/08* (2013.01); *F16H 48/24* (2013.01); *F16H 2048/346* (2013.01)

(58) Field of Classification Search
CPC ........ F16H 48/22–24; F16H 48/34–2048/346; F16H 48/42–2048/423
See application file for complete search history.

(56) References Cited

U.S. PATENT DOCUMENTS

| | | | | |
|---|---|---|---|---|
| 7,086,978 B2 * | 8/2006 | Aikawa | ................. | B60W 10/02 475/5 |
| 7,448,977 B2 * | 11/2008 | Janson | ................ | F16D 25/0638 475/200 |
| 10,641,376 B2 * | 5/2020 | Yoshisaka | ............... | F16H 48/40 |
| 2017/0219023 A1 | 8/2017 | Haupt et al. | | |
| 2020/0132180 A1 | 4/2020 | Tsuzuki et al. | | |
| 2024/0116358 A1 * | 4/2024 | Herbillon | .............. | F16H 57/037 |

FOREIGN PATENT DOCUMENTS

| | | |
|---|---|---|
| DE | 10 2014 215 449 A1 | 2/2016 |
| WO | WO 2022/112996 A1 | 6/2022 |

OTHER PUBLICATIONS

French Preliminary Search Report Issued Jun. 2, 2022 in French Application 21 10682 filed on Oct. 8, 2021(with English Translation of Categories of Cited Documents), 3 pages.

* cited by examiner

*Primary Examiner* — Ernesto A Suarez
*Assistant Examiner* — James J Taylor, II
(74) *Attorney, Agent, or Firm* — Oblon, McClelland, Maier & Neustadt, L.L.P.

(57) ABSTRACT

A motor vehicle transmission system includes a reduction device having at least an output shaft including a first gearwheel and a second gearwheel. A differential drive device is configured to distribute the torque from the reduction device to two half-shafts. The differential drive device includes a coupling device which, in a coupled position, transmits torque between a first element and a second element of the differential drive device, the coupling device further including an actuator. A radial plane, orthogonal to the axes X and W, passes through the first gearwheel and through the coupling device.

17 Claims, 8 Drawing Sheets

TRANSMISSION SYSTEM COMPRISING A REDUCTION DEVICE AND A DIFFERENTIAL DRIVE DEVICE

TECHNICAL FIELD

The invention relates to the field of vehicles and concerns a transmission system which comprises, on the one hand, a reduction device intended to receive the torque from a motor and multiply it and, on the other hand, a differential drive device allowing the torque from the reduction device to be distributed to two half-shafts of a vehicle axle, allowing these half-shafts to rotate at different speeds.

The invention is more particularly aimed at a transmission system of the above-mentioned type wherein the differential drive device comprises a coupling device which is able selectively to couple a first element kinematically connected to the reduction device to a second element which is coupled to at least one of the aforementioned two half-shafts.

TECHNOLOGICAL BACKGROUND

Transmission systems for hybrid or electric vehicles comprising a reduction device receiving the torque supplied by an electric motor and a differential drive device allowing the torque from the reduction device to be distributed to the two half-shafts of an axle of the vehicle, allowing these two half-shafts to rotate at different speeds, are known from the prior art.

The reduction device comprises at least an input shaft and an output shaft. The input shaft is, on the one hand, rotationally coupled to the rotor of the motor and, on the other hand, rotationally coupled to the output shaft by means of one or more gearsets. The output shaft comprises a first gearwheel and a second gearwheel which is smaller than the first. The first gearwheel receives the torque from the motor, while the second gearwheel transmits this torque to the differential drive device. The differential drive device comprises a rotationally mobile differential case which is equipped with a gearwheel in mesh with the second gearwheel of the output shaft. Housed inside the differential case there are a supporting ring guided in rotation in said differential case, two planet pinions mounted with the ability to rotate on the supporting ring about an axis perpendicular to the axis of rotation of the differential case, and two sun gears each of which meshes with the two planet pinions and each of which is secured, for conjoint rotation, to a half-shaft. Moreover, the transmission system comprises a coupling device which has a coupled position allowing the differential case and the supporting ring to be coupled in order to allow torque to be transmitted between the motor and the wheels, and an uncoupled position allowing the transmission of torque between the motor and the half-shafts to be interrupted. The second gearwheel and the coupling device are positioned axially one on each side of the case of the differential.

Transmission systems of the aforementioned type are not satisfactory. In particular, because of the above-mentioned arrangement whereby the second gearwheel and the coupling device are positioned one on each side of the differential case, the transmission device is axially very bulky. In addition, such axial bulkiness leads to additional weight of the casing inside which the transmission system is housed, and this has a negative impact on the energy consumption of motor vehicles equipped with such a transmission system.

SUMMARY

An idea on which the invention is based consists in proposing a transmission system of the aforementioned type having limited bulkiness.

In order to achieve this, a first aspect of the invention is aimed at a motor vehicle transmission system comprising:
- a reduction device comprising at least an output shaft which is rotationally mobile about an axis W, the output shaft comprising a first gearwheel and a second gearwheel which are positioned side-by-side along the axis W, the first gearwheel being intended to be rotationally driven by a motor;
- a differential drive device which is configured to distribute the torque from the reduction device to two half-shafts of an axle of a vehicle, the differential drive device comprising a first element and a second element, each of the first and second elements being rotationally mobile about an axis X, parallel to the axis W, the first element being equipped with a driving gearwheel which is in mesh with the second gearwheel of the output shaft, and the second element being intended to drive at least one of the half-shafts; the differential drive device comprising a coupling device which comprises a first coupling part which is secured, for conjoint rotation, to the first element and a second coupling part which is secured, for conjoint rotation, to the second element, the first coupling part being axially mobile with respect to the first element between a coupled position in which the first coupling part is coupled to the second coupling part to transmit torque between the first element and the second element, and an uncoupled position in which the first coupling part and the second coupling part are uncoupled from one another, the coupling device further comprising an actuator collaborating with the first coupling part in order to move same between the coupled position and the uncoupled position,
- a radial plane, orthogonal to the axes X and W and passing through the first gearwheel and through the coupling device, particularly through the actuator, and notably through the electromagnet thereof.

Thus, given the relative position of the first gearwheel of the output shaft and of the coupling device, the axial bulk of the transmission system is limited. Such a reduction in bulk also allows the mass of the transmission casing(s) in which said transmission system is housed to be reduced accordingly, thereby accordingly reducing the energy consumption of the vehicle equipped with such a transmission system.

According to various embodiments, such a transmission system may have one or more of the following features.

According to one embodiment, the actuator comprises:
- a frame, arranged around the axis X, the frame being fixed axially and circumferentially to a casing of the transmission system; and
- a piston guided in axial translation inside the frame between a retracted position and a deployed position, said piston being arranged in such a way as to move the first coupling part from the uncoupled position towards the coupled position as the piston moves from the retracted position to the deployed position.

According to one embodiment, a radial projection of the first gearwheel onto the axis X, and a radial projection of the coupling device onto the axis X at least partially overlap.

According to one embodiment, a radial plane passes through the first gearwheel and through the actuator of the coupling device.

According to one embodiment, a radial plane passes through the first gearwheel and through the frame of the actuator.

According to one embodiment, the first gearwheel is positioned axially between the second gearwheel and a radial plane, orthogonal to the axis X and passing through an end wall of the frame. This allows the axial bulk of the transmission system to be limited further still, because the first gearwheel of the output shaft is contained within the axial bulk of the coupling device.

According to one embodiment, the frame comprises an internal skirt and an external skirt which are connected by the end wall.

According to one embodiment, the end wall defines one end of the actuator which is the opposite end to the first coupling part.

According to one embodiment, the piston is preferably fixed in terms of rotation about the axis X and is fixed axially to the first coupling part by a pivot connection allowing relative rotation about the axis X of the first coupling part with respect to the piston.

According to one embodiment, the piston is blocked against rotation about the axis X with respect to the frame of the actuator.

According to one embodiment, the coupling device comprises a target which is fixed to the piston and which is intended to be positioned facing a sensor able to deliver a signal representative of the distance between the target and the sensor. Thus, because the target is fixed to the piston, the target is unable to rotate with respect to the sensor.

According to one embodiment, when considered in projection in a plane orthogonal to said axis X, the target is inscribed inside a first angular sector α of centre X, and the first gearwheel is inscribed inside a second angular sector β of centre X, the first angular sector α and the second angular sector β being distinct from one another. This makes it possible to limit the radial bulk of the coupling device in the circumferential region of the coupling device that faces the first gearwheel.

According to one embodiment, the first angular sector α and the second angular sector β are circumferentially opposite on either side of the axis X.

According to one embodiment, there is a plane in which the axis X is contained and which passes through the target and the first gearwheel.

According to one embodiment, the target comprises a detection portion positioned facing the sensor and a fixing tab that passes through an opening in the frame and which is fixed to the piston. Thus, the fixing tab forms an antirotation member preventing or limiting relative rotation, about the axis X, of the piston with respect to the frame.

According to one embodiment, the frame has a recess formed in a region radially facing the first gearwheel. Such a recess frees up space for the passage of the first gearwheel of the output shaft.

According to one embodiment, the frame has an external skirt and the recess is formed in said external skirt.

According to one embodiment, the piston comprises a body made of a ferromagnetic material and the actuator comprises an electromagnet which is housed in the frame and is able to move the piston between the retracted position and the deployed position.

According to one embodiment, the actuator comprises a connecting ring, preferably made from a non-magnetic material and via which the actuating force is transmitted from the body of the piston to the first coupling part.

According to one embodiment, the connecting ring has a groove formed radially facing a groove formed in the first coupling part, a retaining ring being positioned inside the aforementioned two grooves in order to block axial translation of the first coupling part with respect to the connecting ring.

According to one embodiment, the piston and the electromagnet are positioned respectively one inside the other or axially one beside the other.

According to one embodiment, the first element comprises a differential case inside which the second coupling part is housed, the first coupling part comprising an interior portion which is housed inside the differential case, an exterior portion which is positioned outside the differential case and a plurality of connecting portions which axially connect the interior portion and the exterior portion of the first coupling part, each of the connecting portions passing through a corresponding through-opening made in the differential case.

According to one embodiment, the second element comprises a supporting ring which is guided in rotation about the axis X inside the differential case, two planet pinions which are mounted to rotate on the supporting ring about an axis V perpendicular to the axis X, and two sun gears which are able to rotate about the axis X, are each in mesh with the two planet pinions and are each intended to the secured, for conjoint rotation, to a half-shaft.

According to one embodiment, the two planet pinions each have bevel gear teeth which mesh with complementing bevel gear teeth of the two sun gears.

According to one embodiment, the second coupling part of the coupling device is secured, for conjoint rotation, to the supporting ring with respect to the axis X. Thus, when the coupling device is in the coupled position, the transmission system distributes the torque from the motor to the two half-shafts. Conversely, the transmission of torque between the case and the supporting ring is interrupted when the coupling device is in the uncoupled position.

According to one embodiment, the second coupling part of the coupling device is formed of one piece with the supporting ring.

According to another embodiment, the second coupling part is secured, for conjoint rotation, to one of the sun gears. In such an embodiment, when the first coupling part is in the coupled position, torque is transmitted between the first element and the second element via the gearsets, but the differential function is locked by the coupling device, thereby preventing the half-shafts from rotating at different speeds.

According to one embodiment, the reduction device comprises an input shaft intended to be rotationally coupled to the motor and mounted with the ability to rotate about an axis Y, parallel to the axes X and W, said input shaft comprising a gearwheel able, directly or indirectly, to drive the rotation of the first gearwheel of the output shaft.

According to one embodiment, the reduction device comprises an intermediate shaft which is mounted with the ability to rotate about an axis Z, parallel to the axes X, Y and W, the intermediate shaft comprising a first gearwheel in mesh with the gearwheel of the input shaft and a second gearwheel in mesh with the first gearwheel of the output shaft.

According to one embodiment, the gearwheel of the input shaft, the first gearwheel of the intermediate shaft and the second gearwheel of the output shaft and the driving gearwheel of the differential drive device are positioned radially in the one same radial plane orthogonal to the axis X.

According to one embodiment, the first gearwheel and the second gearwheel of the output shaft of the reduction device are situated axially, along the axis X, on the same side of the axis V.

According to one embodiment, the two planet pinions and the two sun gears provide a differential function and the coupling and uncoupling zone (for example claw couplings) of the coupling device is positioned kinematically upstream of the differential function.

In general, according to one embodiment, the coupling and uncoupling zone of the coupling device is positioned kinematically upstream of the differential function of the differential drive device.

According to one embodiment, the first gearwheel and the actuator of the coupling device are situated axially, along the axis X, on the same side of the second gearwheel.

According to one embodiment, the radial plane, orthogonal to the axes X and W and passing through the first gearwheel and through the coupling device, passes through the actuator, and notably through the frame thereof.

According to one embodiment, the first gearwheel and the second gearwheel of the output shaft of the reduction device and the coupling device and notably the actuator thereof, are situated axially, along the axis X, on the same side of the axis V.

According to one embodiment, all the gearwheels of the reduction device are situated axially along the axis X on the same side of the axis V as the coupling device and notably of the actuator thereof.

A second aspect of the invention relates to a powertrain comprising an electric machine and an aforementioned transmission system, the electric machine being coupled to an input member of the reduction device.

According to one embodiment, the transmission system comprises a casing, none of the wheels of the reduction device being positioned axially between the casing of the transmission system and the differential case on the side of the differential drive device opposite to the actuator. In other words, space is freed up on this side of the differential drive device.

The invention also relates to an electromagnetic actuator comprising a piston and an electromagnet which are positioned axially side-by-side. In this way it is possible to reduce the radial bulk of the actuator. The actuator may further exhibit one or more of the features mentioned previously.

BRIEF DESCRIPTION OF THE FIGURES

The invention will be better understood, and other aims, details, features and advantages thereof will become clearer, from the following description of a plurality of particular embodiments of the invention, provided solely by way of nonlimiting illustration, with reference to the appended drawings.

DESCRIPTION OF THE EMBODIMENTS

In the description and the claims, the terms "external" and "internal" and the orientations "axial" and "radial" will be used to denote elements of the transmission system according to the definitions given in the description. By convention, the axis X of rotation of the differential case defines the "axial" orientation. The "radial" orientation is directed orthogonally to the axis X and from the inside towards the outside moving away from said axis.

Figure 1:
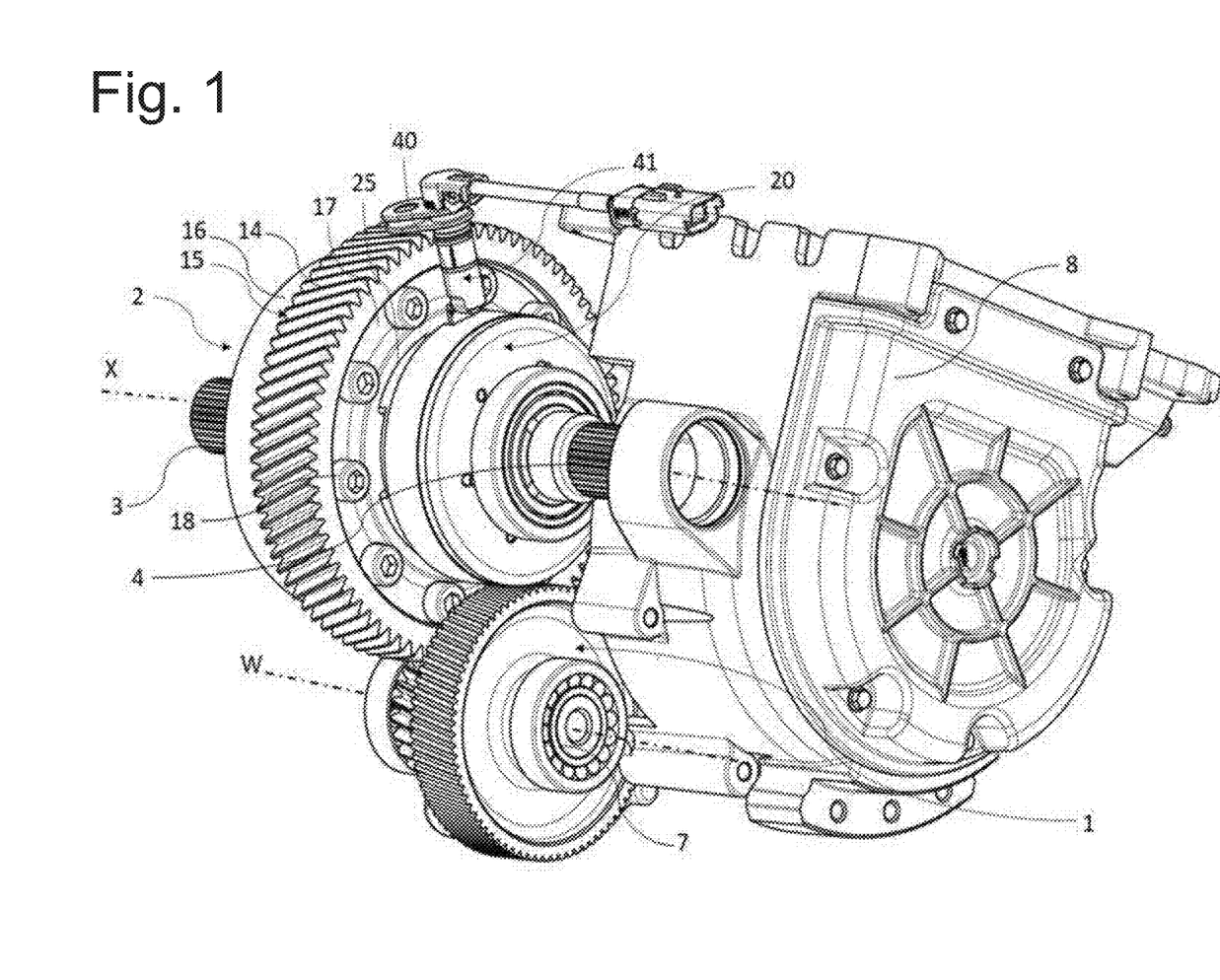
FIG. 1 is a perspective view of a transmission device according to a first embodiment.
Figure 4:
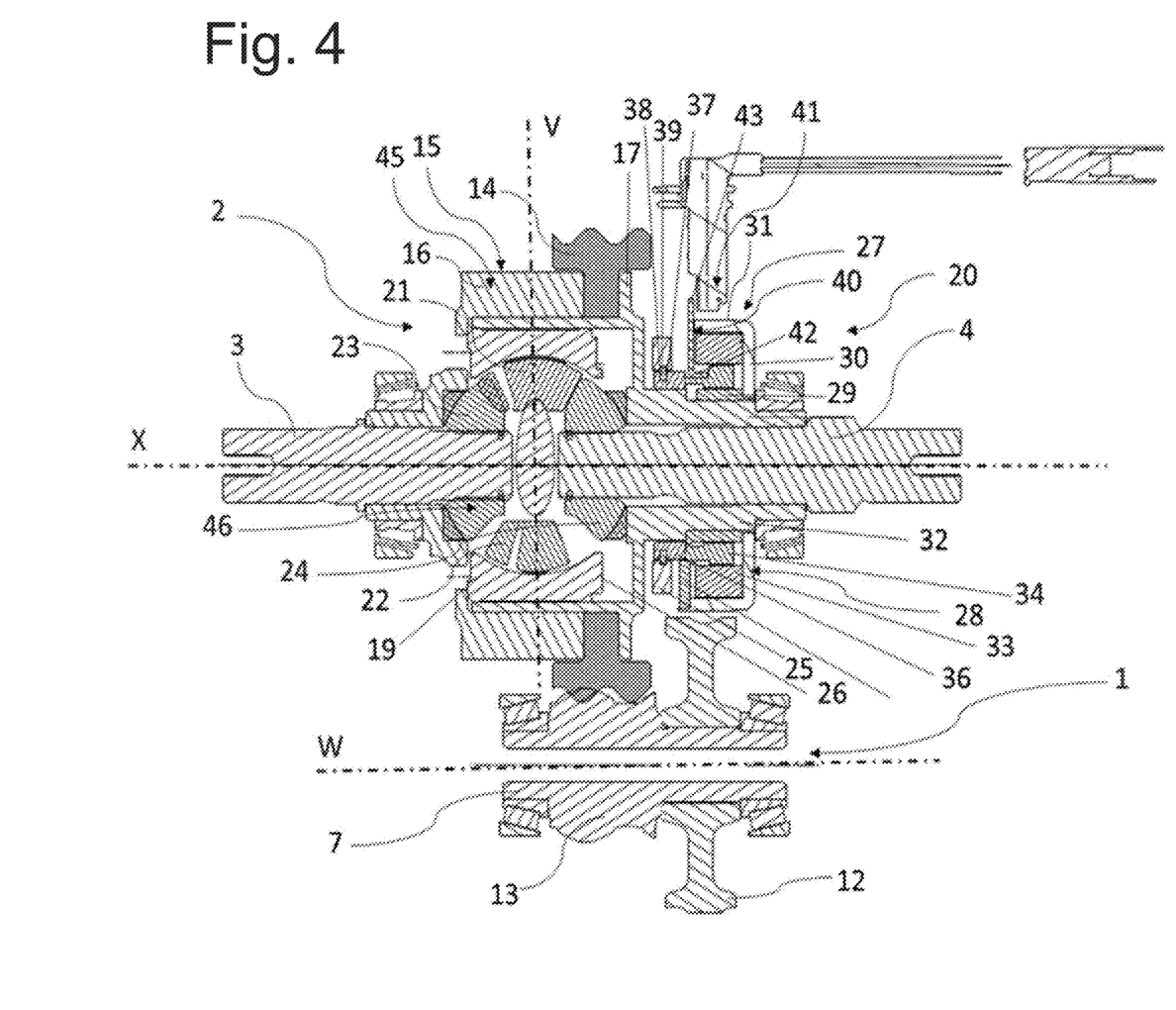
FIG. 4 is a view in section on the plane IV-IV of FIG. 3.

FIGS. 1 and 4 illustrate a transmission system according to a first embodiment. The transmission system comprises a reduction device 1 and a differential drive device 2. The reduction device 1 is intended to be coupled, on the one hand, to a motor, such as an electric motor, not depicted, and, on the other hand, to the differential drive device 2. The differential drive device 2 is intended to drive the rotation of two half-shafts 3, 4 of an axle of the vehicle and is configured to distribute torque between the reduction device 1 and the two half-shafts 3, 4, allowing them to rotate at different speeds.

According to one embodiment, such a transmission system is intended for a hybrid vehicle. Thus, the transmission system is, for example, able to transmit a torque from an electric motor to a rear or front axle of the vehicle, while another transmission system, coupled to another motor/engine, such as a combustion engine, is able to generate a torque and transmit it between this other motor/engine and the two half-shafts of the other axle of the vehicle.

Figure 2:
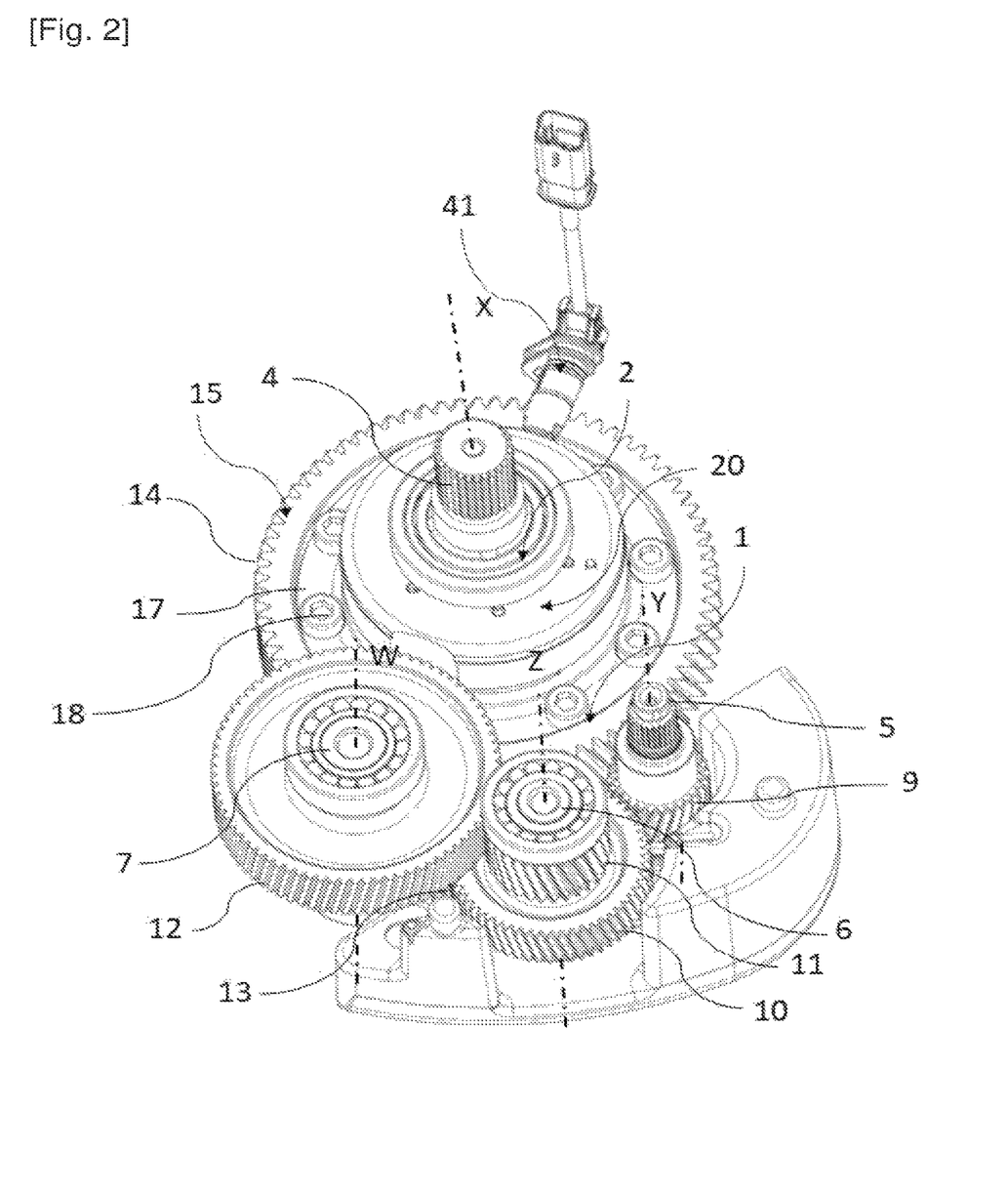
FIG. 2 is another perspective view of the transmission system of FIG. 1, in which the casing part illustrated in FIG. 1 is not depicted.
Figure 3:
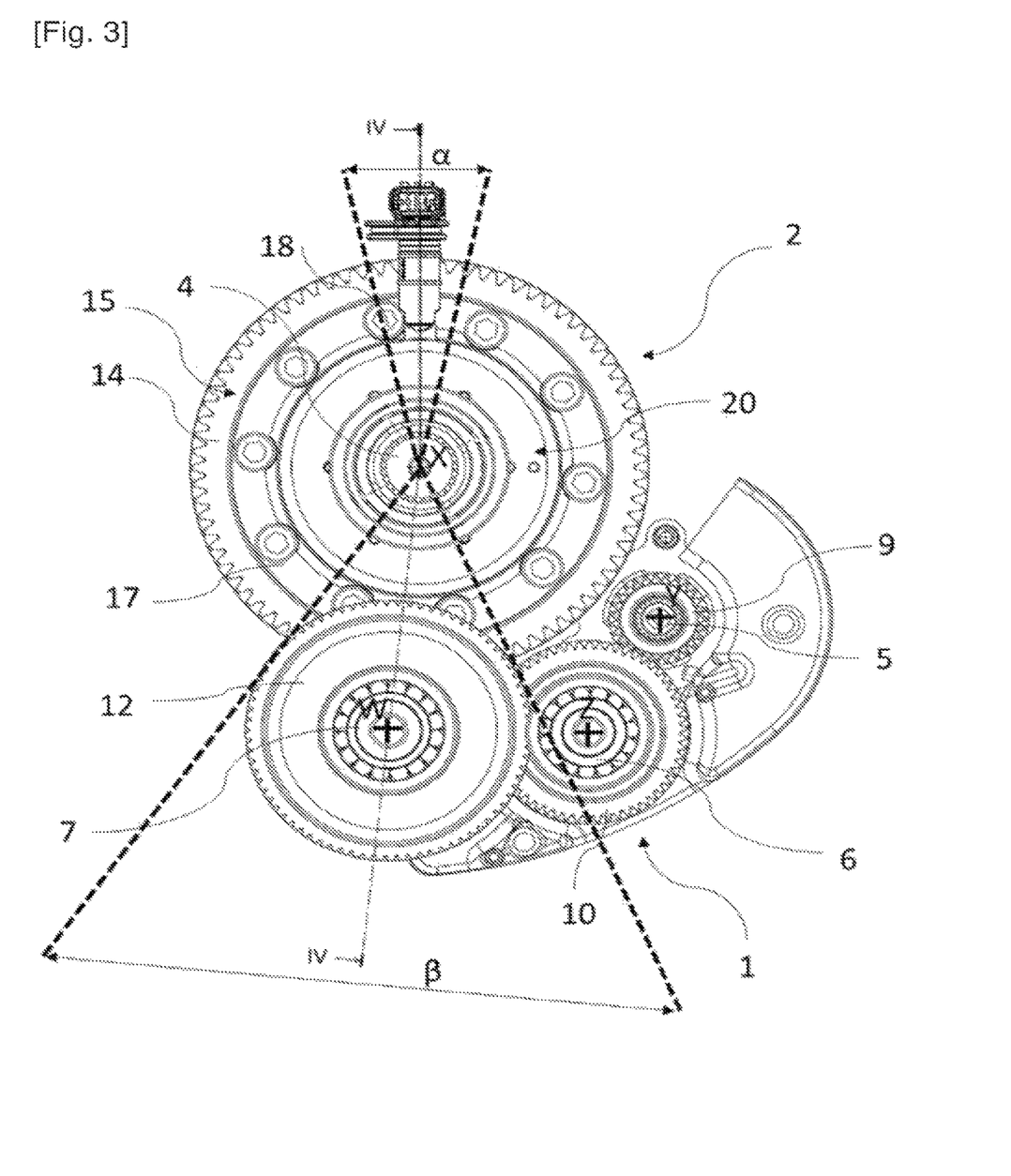
FIG. 3 is a side view of the transmission system of FIGS. 1 and 2.

In the embodiment depicted, the reduction device 1 comprises three shafts, all visible in FIGS. 2 and 3, namely an input shaft 5, an intermediate shaft 6 and an output shaft 7. The input shaft 5, the intermediate shaft 6, and the output shaft 7 are mounted with the ability to rotate on a transmission casing 8, partially depicted in FIG. 1. The input shaft 5, the intermediate shaft 6, and the output shaft 7 are able to rotate about axes, respectively denoted Y, Z, W, which are parallel to one another. The input shaft 5 is intended to be rotationally coupled to the rotor of the motor, coaxial therewith. The input shaft 5 comprises a gearwheel 9 while the intermediate shaft 6 and the output shaft 7 each comprise two gearwheels 10, 11, 12, 13 of different sizes. The gearwheel 9 of the input shaft 5 is in mesh with the larger gearwheel 10 of the intermediate shaft 6, while the smaller gearwheel 11 of the intermediate shaft 6 is in mesh with the larger gearwheel 12 of the output shaft 7. Finally, the smaller gearwheel 13 of the output shaft 7 is in mesh with a driving gearwheel 14 of the differential drive device 2. The larger gearwheel 12 and the smaller gearwheel 13 of the output shaft 7 are respectively referred to hereinafter as the "first gearwheel" and "second gearwheel". The reduction device 1 thus produces, from the motor to the differential drive device 2, a transmission ratio less than 1 so that the torque delivered to the half-shafts 3, 4 can be higher than that delivered at the output of the motor. In the embodiment detailed above, the reduction device 1 has three reduction stages. As a preference, in order to limit the axial bulk of the reduction device 1, the gearwheels 9, 10 forming the first reduction stage are situated in the one same radial plane as the gearwheels 13, 14 forming the third reduction stage. In other embodiments, the reduction device 1 may comprise just two reduction stages or else may comprise more than three reduction stages.

As illustrated in FIG. 4, the differential drive device 2 comprises:
- a first element 45 which is rotationally mobile about the axis X and kinematically coupled to the second gearwheel 13 of the output shaft 7 of the reduction device 1;
- a second element 46 which is likewise rotationally mobile about the axis X and intended to drive the half-shafts 3, 4; and
- a coupling device 20 able selectively to couple and uncouple the first element 45 and the second element 46.

The first element 45 of the differential drive device 2 comprises a differential case 15, visible in FIG. 3, and the driving gearwheel 14, which is securely fixed, for conjoint rotation, to the differential case 15. The differential case 15 comprises two parts 16, 17 which are fixed to one another and to the driving gearwheel 14. in the embodiment depicted, each of the two parts 16, 17 of the differential case 15 is flanged. The aforementioned two flanges sandwich an internal flange of the driving gearwheel 14. Fasteners, such as screws 18 depicted in FIGS. 1 to 3, pass through the flanges of two parts 16, 17 of the differential case 15 and of the internal flange of the driving gearwheel 14 in order to fix these parts together.

In connection with FIG. 4, it may be seen that the second element 46 of the differential drive device 2 comprises a supporting ring 19 of annular shape, which is guided in rotation, about the axis X, inside the differential case 15. For this purpose, the differential case 15 has an internal cylindrical portion collaborating with a cylindrical external surface of the supporting ring 19. The second element 46 further comprises two planet pinions 21, 22 as well as two sun gears 23, 24 which are also visible in FIG. 4. The planet pinions 21, 22 are mounted with the ability to rotate on the supporting ring 19 about an axis V perpendicular to the axis X. The two planet pinions 21, 22 each have bevel gear teeth which mesh with complementing bevel gear teeth of the two sun gears 23, 24. The two sun gears 23, 24 are rotationally mobile about the axis X and are each secured, for conjoint rotation, to one of the two half-shafts 3, 4. The supporting ring 19, the planet pinions 21, 22 and the sun gears 23, 24 thus form a differential allowing the two half-shafts 3, 4 to rotate at different speeds.

The coupling device 20 is configured to selectively transmit torque between the differential case 15 and the supporting ring 19. Thus, when the coupling device 20 is in the coupled position, the transmission system allows torque to be transmitted between the motor and the half-shafts 3, 4, while performing a differential function to allow the half-shafts 3, 4 different rotational speeds. When the coupling device 20 is in the uncoupled position, transmission between the motor and the half-shafts 3, 4 is interrupted.

In another embodiment which has not been depicted, the coupling device is configured to couple the first element 45 to one of the two sun gears 23, 24. In such an embodiment, the supporting ring 19 is secured, for conjoint rotation, to the differential case 15 or else the two planet pinions 21, 22 are mounted to rotate directly on the differential case 15. Such a coupling device is therefore aimed at preventing the two half-shafts 3, 4 that drive the wheels from rotating at different speeds (at locking up the differential).

Returning to FIG. 4, it may be seen that the coupling device 20 comprises a first coupling part 25. A person skilled in the art may also refer to document US2002155913, notably to FIG. 2 thereof, in respect of those elements mentioned hereinbelow that are not visible in FIG. 4. The first coupling part 25 is secured, for conjoint rotation, to the differential case 15, while at the same time being capable of moving axially with respect thereto. The first coupling part 25 is able to move between an uncoupled position in the coupled position. In the coupled position, the first coupling part 25 is coupled, in terms of rotation, to a second coupling part 26 secured, for conjoint rotation, to the supporting ring 19, thereby allowing torque to be transmitted between the differential case 15 and the supporting ring 19. By contrast, in the coupled position, the first coupling part 25 is uncoupled from the second coupling part 26 so that the transmission of torque between the case 8 and the supporting ring 19 is interrupted.

The coupling device 20 is, for example, a claw coupling device. Thus, of the first and second coupling parts 25, 26, one comprises teeth while the other comprises corresponding slots into which said teeth engage when the first coupling part 25 is in the coupled position. In the embodiment depicted, the second coupling part 26 is formed of one piece with the supporting ring 19. In other words, teeth or slots are formed in the lateral face of the supporting ring 19 which face faces toward the first coupling part 25. However, although the invention has been described in connection with a claw-type coupling device, it is not restricted thereto, and the coupling device could be of another type and notably a friction coupling device.

The first coupling part 25 comprises an interior portion, not visible in FIG. 4, which is housed inside the differential case 15, an exterior portion, which is positioned outside the differential case 15, and connecting portions which are evenly distributed about the axis X and each pass through a corresponding through-opening, not visible, formed in the part 17 of the differential case 15. The aforementioned connecting portions thus allow the first coupling part 25 to be secured, for conjoint rotation, to the differential case 15 while at the same time allowing relative axial movement between the first coupling part 25 and the differential case 15. In one embodiment, the exterior portion is annular whereas the interior portion comprises tabs extending axially in the continuation of the connecting portions. However, according to another embodiment, the structure is reversed and the interior portion is annular whereas the exterior portion comprises a plurality of axially oriented tabs extending in the continuation of the connecting portions.

Moreover, the coupling device comprises an actuator 27 allowing the first coupling part 25 to be moved between the coupled position and the uncoupled position.

The actuator 27 comprises a frame 28 which is mounted so that it is fixed axially and circumferentially about the axis X, on a casing of the transmission system. The frame 28 is of annular shape. The frame 28 has an internal skirt 29, a radially oriented end wall 30, and an external skirt 31 and these together define an annular space. The internal skirt 29 is fitted around a lateral sleeve 32 of the part 17 of the differential case 15, while still allowing the lateral sleeve 32 and, therefore, the differential case 15, to rotate with respect to the frame 28 of the actuator 27, about the axis X.

The actuator 27 is an electromagnetic actuator. It comprises an electromagnet 33 which is housed in the frame 28. The electromagnet 33 defines, in the annular space of the frame 28, an internal housing inside which a piston 34 is guided axially in translation between a retracted position and a deployed position. The actuator 27 further comprises a cap 35, preferably a magnetic cap, which closes the internal housing. The cap 35 comprises an abutment surface which is intended to collaborate with an abutment surface of the piston 34 in order to define the deployed position of the piston 34.

The piston 34 comprises a body, of annular shape, made of ferromagnetic material such as iron or steel for example. Advantageously, as detailed hereinbelow, the piston 34 is blocked against rotation with respect to the frame 28 of the actuator 27.

The piston 34 also comprises a connecting ring 36, likewise of annular shape, by means of which the actuating force is transmitted from the body of the piston 34 to the first coupling part 25. The body of the piston 34 and the connecting ring 36 are fixed to one another by any means, such as adhesive bonding, laser welding, force-fitting, fixing pins or other means. The connecting ring 36 is advantageously made from a non-magnetic material, such as copper for example, in order to avoid undesirable emanations of magnetic flux towards the other components of the coupling device 20.

The connecting ring 36 is fixed to the first coupling part 25 by a pivot connection. In other words, the connecting ring 36 is fixed axially to the first coupling part 25 while at the same time allowing relative rotation of the first coupling part 25 with respect to the connecting ring 36 about the axis X. The axial movement of the piston 34 from the retracted position into the deployed position therefore causes the first coupling part 25 to move from the coupled position towards the uncoupled position, whereas the return of the piston 34 to the retracted position causes the first coupling part 25 to return towards the uncoupled position.

In the embodiment depicted, the connecting ring 36 has a groove 37 which is formed radially facing a groove 38 formed in the first coupling part 25. A retaining ring 39, positioned inside the two aforementioned grooves 37, 38, thus makes it possible to block axial translation of the first coupling part 25 with respect to the connecting ring 36, while at the same time allowing relative rotation. The retaining ring 39 may be mounted in the grooves 37, 38 by clip-fastening or snap-fastening.

In an alternative embodiment which has not been depicted, the groove 37 is formed directly on the body of the piston 34 and the actuator 27 therefore has no connecting ring 36.

The actuator 27 also comprises return members, not depicted, which are able to elastically return the first coupling part 25 towards the uncoupled position. The return members are, for example, helical springs which, on the one hand, bear axially against the differential case 15 and, on the other hand, bear axially against the first coupling part 25.

When the electromagnet 33 is powered with a current stronger than a threshold current, it allows the piston 34 to be moved from the retracted position to the deployed position. When the piston 34 is in the deployed position, the magnetic cap 35 exerts an attraction on the body of the piston 34, enabling it to be held in the deployed position. The strength of the current with which the electromagnet 33 is powered can then be reduced so long as it remains above the threshold current strength. When the electromagnet 33 is unpowered, or is powered with a current of a strength lower than the threshold current strength, the return members are able to overcome the force of attraction between the cap 35 and the body of the piston 34, enabling the piston 34 to be returned from the deployed position to the retracted position.

As illustrated for example in FIG. 4, the coupling device 20 and the first gearwheel 12 of the output shaft 7 of the reduction device 1 are positioned on the one same side of the differential case 15. Furthermore, the first gearwheel 12 and the coupling device 20, particularly the actuator 27 and notably the electromagnet 33, are positioned radially one above the other. Thus, the radial projection of the first gearwheel onto the axis X, and the radial projection of the coupling device (particularly of the actuator 27 and notably of the electromagnet 33) onto the axis X at least partially overlap. In other words, a plane orthogonal to the axes X and Z passes simultaneously through the first gearwheel 12 and through the coupling device 20 (particularly through the actuator 27 and notably through the electromagnet 33 thereof).

Furthermore, advantageously, the first gearwheel 12 is contained within the axial bulk of the coupling device 20 (particularly the actuator 27, particularly the electromagnet 33, thereof). Thus, the first gearwheel 12 is positioned axially between a first radial plane, orthogonal to the axis X, passing through the end wall 30 of the frame 28, and the second gearwheel 13.

Moreover, the coupling device 20 is also equipped with a target 40 which is fixed to the piston 34 and which is positioned axially facing a sensor 41. The sensor 41 is configured to deliver a signal representative of the distance between the target 40 and the sensor 41. The signal delivered by the sensor 41 makes it possible to determine the status of the coupling device, namely whether it is in the coupled position, in the uncoupled position, or in an intermediate position. The sensor 41 is a contactless and advantageously magnetic sensor, such as a Hall-effect sensor for example. Other types of sensor, notably contactless sensors, may be used.

The target 40 comprises a detection portion 43 positioned facing the sensor 41 and a fixing tab 42 that passes through an opening in the frame 28 and which is fixed to the piston 34.

In the embodiment depicted, the target 40 is formed as one piece in magnetic sheet metal. In another embodiment which has not been depicted, the detection portion 43 is formed of a component, such as a magnetic metal sheet or magnet, which is attached to the fixing tab 42. In that case, the fixing tab 42 may be produced in a non-magnetic material.

In the embodiment depicted, the fixing tab 42 passes through an opening formed in the cap 35 of the frame 28. However, as an alternative, the fixing tab 42 may equally pass through an opening formed in the external skirt 31 of the frame 28. The fixing tab 42 may notably be fixed to the piston 34 by welding, bonding or insetting.

The passing of the fixing tab 42 of the target 40 through an opening in the frame 28 allows the creation of an antirotation member preventing or limiting relative rotation, about the axis X, of the piston 34 with respect to the frame 28.

It will be noted that, because the first coupling part 25 is axially fixed with respect to the piston 34, the axial movement of the piston 34 is equal to the axial movement of the first coupling part 25 which means that the target 40 can both be fixed to the piston 34 and deliver a signal representative of the position of the first coupling part 25. Furthermore, because the target 40 is fixed to the piston 34, which is itself unable to rotate, the target 40 is unable to rotate with respect to the sensor 41. The target 40 therefore need not be circular. This then makes it possible to limit the radial bulk of the coupling device 20 (notably of the actuator 27) and thus makes it easier to position the coupling device 20 and the first gearwheel 12 of the output shaft 7 radially one above the other.

It may further be noted that, when considered in projection along the axis X in a plane orthogonal to said axis X, the target 40 is inscribed inside an angular sector of centre X, denoted a in FIG. 3. The angular sector α is distinct from the angular sector β in which the first gearwheel 12 is inscribed. Thus, the target 40 does not impede the positioning of the first gearwheel 12 of the output shaft 7 as close as possible to the axis X, thereby enabling the coupling device 20 and the first gearwheel 12 to be positioned radially one above the other, even when the size of the first gearwheel 12 is great in order to obtain a low transmission ratio.

In the embodiment depicted, the target 40 and the first gearwheel 12 are circumferentially opposed, one on each side of the axis X. In other words, there is a plane containing the axis X and passing both through the target 40 and through the first gearwheel 12.

Figure 5:
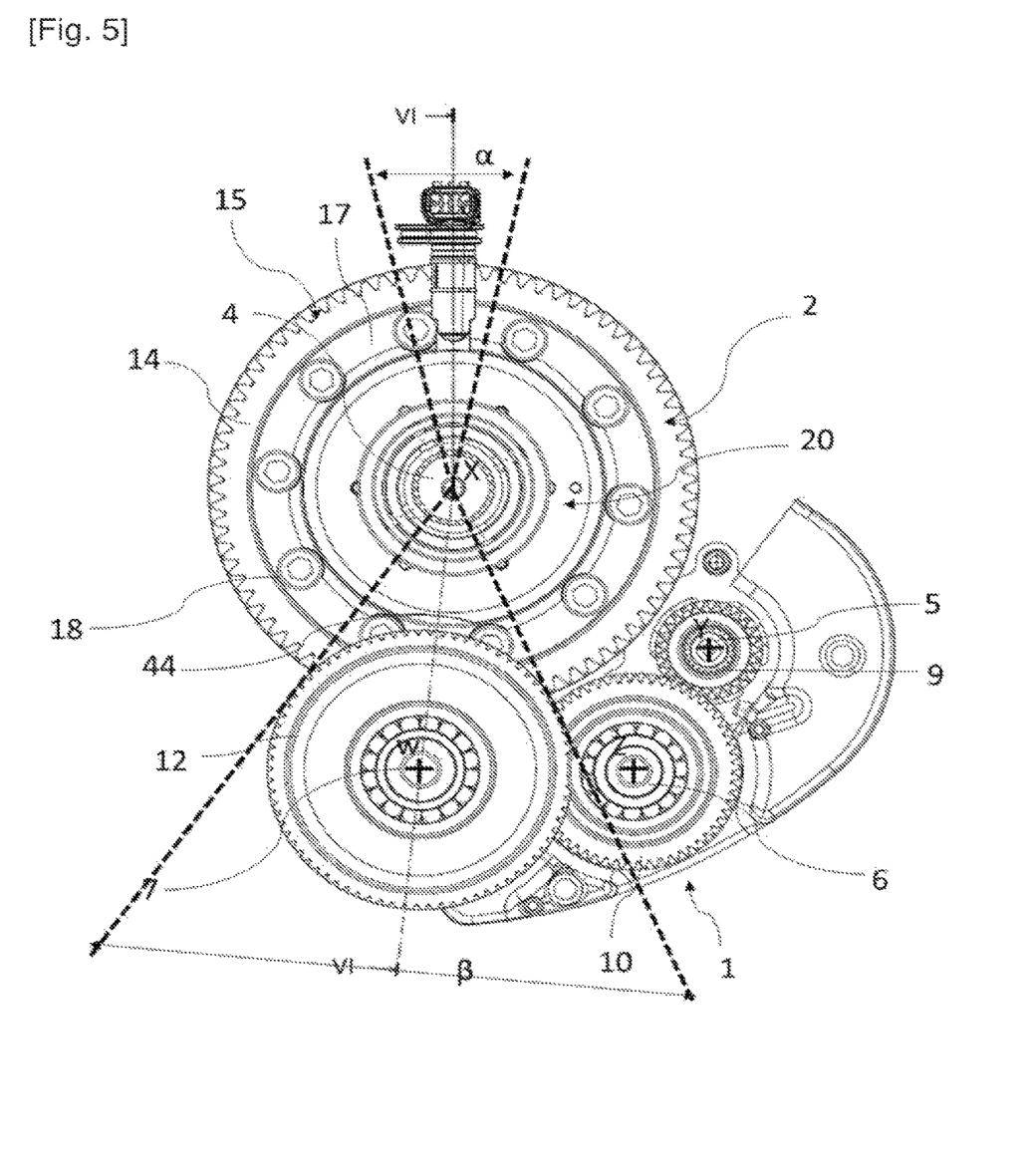
FIG. 5 is a side view of a transmission system according to another embodiment variant.
Figure 6:
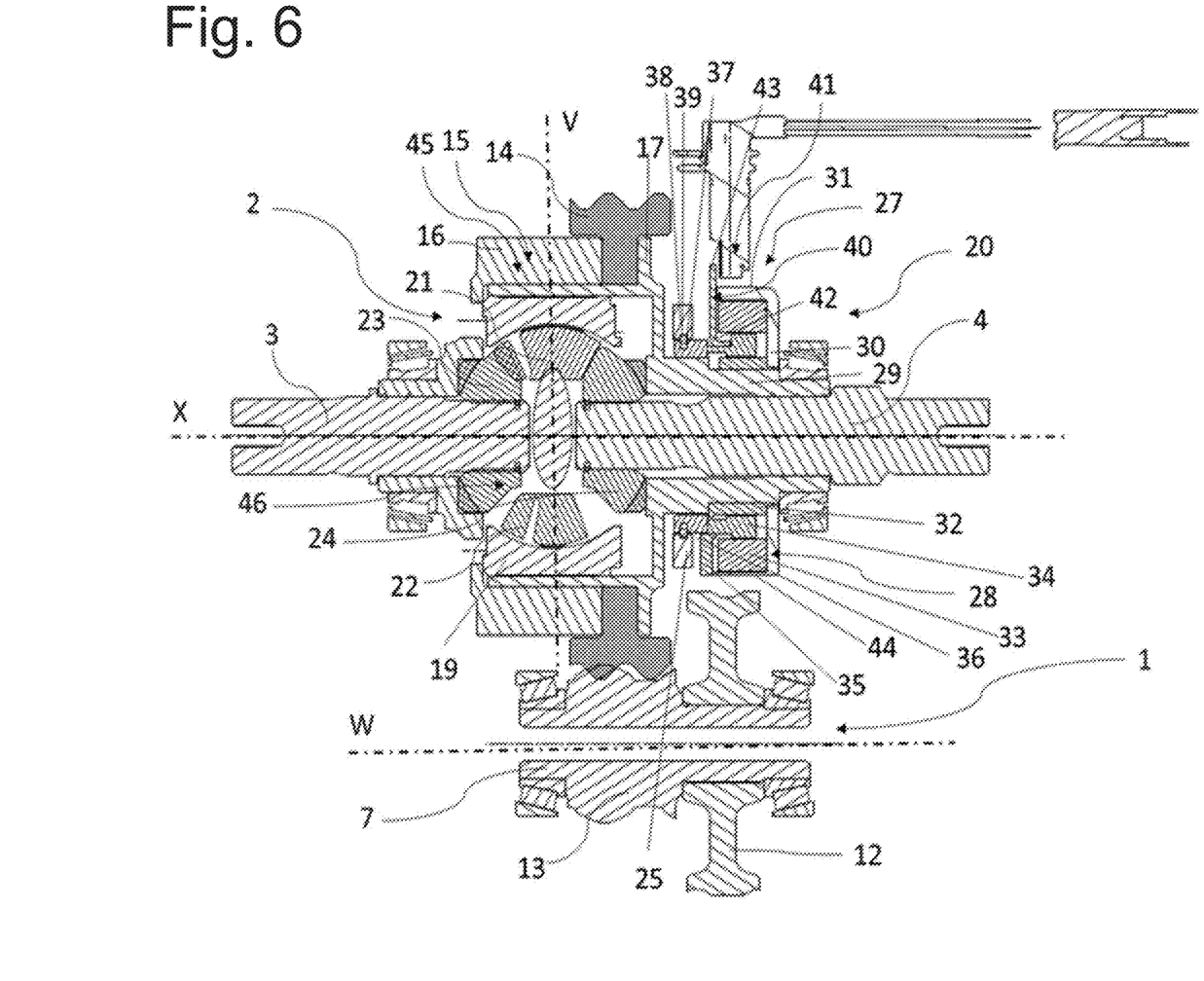
FIG. 6 is a view in section on the plane VI-VI of FIG. 5.

FIGS. 5 and 6 illustrate a transmission system according to another embodiment. This transmission system differs from the one described hereinabove in connection with FIGS. 1 to 4 only in that the frame 28 of the actuator 27 exhibits locally, in the angular sector β in which the first gearwheel 12 is positioned, a recess 44 which may be blind or open-ended. The recess 44 makes it possible to limit, or even eliminate, the thickness of the external skirt 31 of the frame 28 in that region of said external skirt 31 that lies facing the first gearwheel 12. This means that the periphery of the first gearwheel 12 can be positioned even closer to the axis X, allowing the fitting of an even larger gearwheel 12 if the transmission ratio needs to be limited further still.

In the embodiment depicted, the recess 44 forms a circular cavity of which the radius of curvature is substantially equal to the external radius of the first gearwheel 12.

Figure 7:
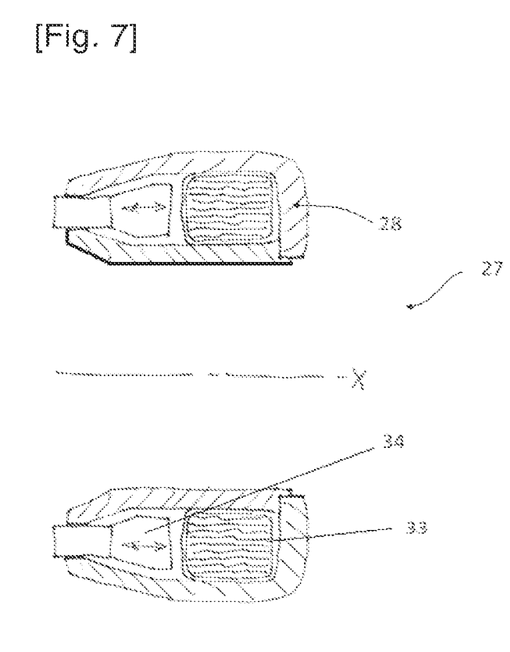
FIG. 7 is a schematic illustration, in cross section, of an actuator of the coupling device according to an embodiment variant.

FIG. 7 schematically illustrates an actuator 27 according to an embodiment variant and which may be used as an alternative to the actuator 27 described previously. This embodiment differs from the actuator 27 described previously in that the piston 34 is not positioned radially on the inside or on the outside of the electromagnet 33 but on the same diameter whereas. The piston 34 and the electromagnet 33 are thus positioned axially side-by-side. Such an embodiment variant is advantageous in that it enables the radial bulk of the actuator 27 to be reduced further still and thus allows the fitting of an even larger gearwheel 12.

Figure 8:
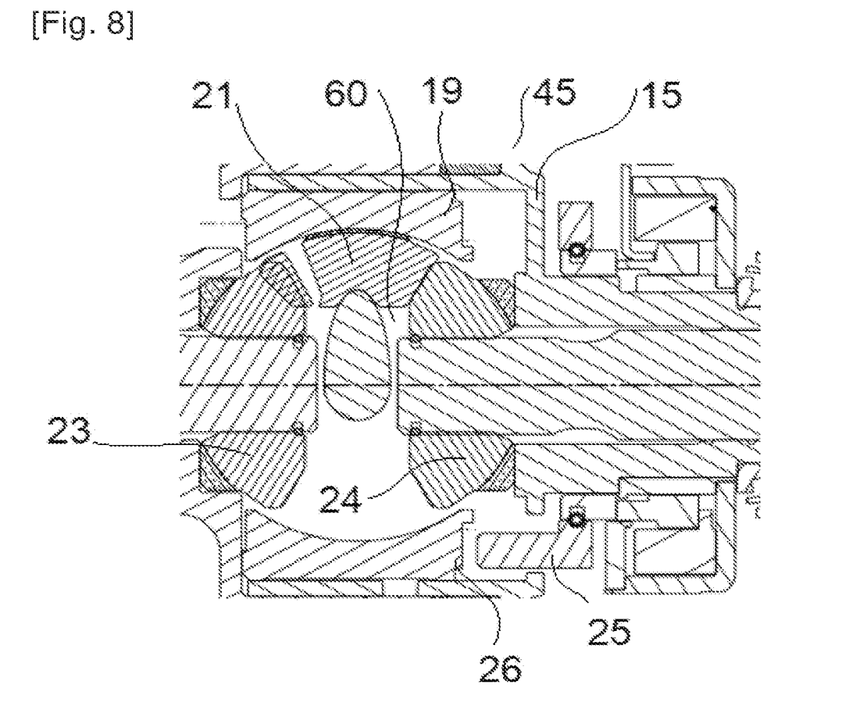
FIG. 8 is another view in section of FIG. 5.

In FIG. 8 it may be seen that the first element 45 comprises a differential case 15 inside which the second coupling part 26 is housed. The first coupling part 25 comprises an interior portion which is housed inside the differential case 15, an exterior portion which is positioned outside the differential case 15 and a plurality of connecting portions which axially connect the interior portion and the exterior portion of the first coupling part 25, each of the connecting portions passing through a corresponding through-opening made in the differential case 15.

The differential function 60, performed by the two planet pinions (one of them referenced 21 and the other not depicted) and the two sun gears 23, 24, is housed inside the supporting ring 19. It may thus be seen that the coupling and uncoupling zone is positioned kinematically upstream of the differential function.

Although the invention has been described in connection with a plurality of particular embodiments, it is obvious that it is in no way limited thereto and that it comprises all technical equivalents of the means described and combinations thereof where these fall within the scope of the invention as defined in the claims.

The use of the verbs "have", "comprise" or "include" and conjugated forms thereof does not exclude the presence of elements or steps other than those stated in a claim.

In the claims, any reference sign between parentheses should not be interpreted as limiting the claim.

The invention claimed is:

1. Transmission system for a motor vehicle, comprising:
   a reduction device comprising at least an output shaft which is rotationally mobile about an axis W, the output shaft comprising a first gearwheel and a second gearwheel which are positioned side-by-side along the axis W, the first gearwheel being intended to be rotationally driven by a motor;
   a differential drive device which is configured to distribute torque from the reduction device to two half-shafts of an axle of the motor vehicle, the differential drive device comprising a first element and a second element, each of the first and second elements being rotationally mobile about an axis X, parallel to the axis W, the first element being equipped with a driving gearwheel which is in mesh with the second gearwheel of the output shaft, and the second element being intended to drive at least one of the two half-shafts; the differential drive device comprising a coupling device which comprises a first coupling part which is secured, for conjoint rotation, to the first element and a second coupling part which is secured, for conjoint rotation, to the second element, the first coupling part being axially mobile with respect to the first element between a coupled position in which the first coupling part is coupled to the second coupling part to transmit torque between the first element and the second element, and an uncoupled position in which the first coupling part and the second coupling part are uncoupled from one another, the coupling device further comprising an actuator collaborating with the first coupling part in order to move the first coupling part between the coupled position and the uncoupled position,
   a radial plane, orthogonal to the axes X and W and passing through the first gearwheel and through the coupling device,
   wherein a recess is provided in a region radially facing the first gearwheel along the radial plane,
   wherein the recess and the first gearwheel overlap at a position along the axis X,
   wherein the actuator includes a frame, arranged around the axis X, the frame being fixed axially and circumferentially to a casing of the transmission system, and
   wherein the recess is included with the frame.

2. Transmission system according to claim 1, wherein the actuator comprises:
   a piston guided in axial translation inside the frame between a retracted position and a deployed position, said piston being arranged in such a way as to move the first coupling part from the uncoupled position towards the coupled position as the piston moves from the retracted position to the deployed position.

3. Transmission system according to claim 2, wherein the first gearwheel is positioned axially between the second gearwheel and a radial plane, orthogonal to the axis X and passing through an end wall of the frame.

4. Transmission system according to claim 3, wherein the piston is fixed in terms of rotation about the axis X and fixed axially to the first coupling part by a pivot connection allowing relative rotation about the axis X of the first coupling part with respect to the piston; and wherein the coupling device comprises a target which is fixed to the piston and which is intended to be positioned facing a sensor able to deliver a signal representative of a distance between the target and the sensor.

5. Transmission system according to claim 3, wherein the piston comprises a body made of a ferromagnetic material and wherein the actuator comprises an electromagnet which is housed in the frame and is able to move the piston between the retracted position and the deployed position, and wherein the piston and the electromagnet are positioned respectively one inside the other or axially one beside the other.

6. Transmission system according to claim 2, wherein the piston is fixed in terms of rotation about the axis X and fixed axially to the first coupling part by a pivot connection allowing relative rotation about the axis X of the first coupling part with respect to the piston; and wherein the coupling device comprises a target which is fixed to the piston and which is intended to be positioned facing a sensor able to deliver a signal representative of a distance between the target and the sensor.

7. Transmission system according to claim 6, wherein, when considered in projection in a plane orthogonal to said axis X, the target is inscribed inside a first angular sector (α) of centre X, and the first gearwheel is inscribed inside a second angular sector (β) of the centre X, the first angular sector (α) and the second angular sector (β) being distinct from one another.

8. Transmission system according to claim 7, having a plane along the axis X in which the axis X is contained and which passes through the target and the first gearwheel.

9. Transmission system according to claim 6, having a plane in which the axis X is contained and which passes through the target and the first gearwheel.

10. Transmission system according to claim 2, wherein the piston comprises a body made of a ferromagnetic material and wherein the actuator comprises an electromagnet which is housed in the frame and is able to move the piston between the retracted position and the deployed position, and wherein the piston and the electromagnet are positioned respectively one inside the other or axially one beside the other.

11. Transmission system according to claim 2, wherein the first element comprises a differential case inside which the second coupling part is housed, the first coupling part comprising an interior portion which is housed inside the differential case, an exterior portion which is positioned outside the differential case and a plurality of connecting portions which axially connect the interior portion and the exterior portion of the first coupling part, each of the connecting portions passing through a corresponding through-opening made in the differential case.

12. Transmission system according to claim 1, wherein the first element comprises a differential case inside which the second coupling part is housed, the first coupling part comprising an interior portion which is housed inside the differential case, an exterior portion which is positioned outside the differential case and a plurality of connecting portions which axially connect the interior portion and the exterior portion of the first coupling part, each of the connecting portions passing through a corresponding through-opening made in the differential case.

13. Transmission system according to claim 12, wherein the second element comprises a supporting ring which is guided in rotation about the axis X inside the differential case, two planet pinions which are mounted to rotate on the supporting ring about an axis V perpendicular to the axis X, and two sun gears which are able to rotate about the axis X, are each in mesh with the two planet pinions and are each intended to be secured, for conjoint rotation, to a corresponding one of the two half-shafts.

14. Transmission system according to claim 13, wherein the first gearwheel and the second gearwheel of the output shaft of the reduction device are situated axially, along the axis X, on the same side of the axis V.

15. Transmission system according to claim 1, wherein coupling and uncoupling zones of the coupling device is positioned kinematically upstream of the differential function of the differential drive device.

16. Transmission system according to claim 1, wherein the radial plane, orthogonal to the axes X and W and passing through the first gearwheel and through the coupling device, passes through the actuator.

17. Powertrain comprising an electric machine and the transmission system according to claim 1, the electric machine being coupled to an input member of the reduction device.

\* \* \* \* \*